United States Patent
Napiorkowski

(10) Patent No.: US 6,680,839 B2
(45) Date of Patent: Jan. 20, 2004

(54) APPARATUS AND METHOD FOR REDUCING AND BALANCING THE CAPACITANCE OF OVERVOLTAGE PROTECTOR IN HIGH FREQUENCY TRANSMISSIONS

(75) Inventor: John J. Napiorkowski, Irving, TX (US)

(73) Assignee: Corning Cable Systems LLC, Hickory, NC (US)

( * ) Notice: Subject to any disclaimer, the term of this patent is extended or adjusted under 35 U.S.C. 154(b) by 106 days.

(21) Appl. No.: 10/034,167

(22) Filed: Dec. 28, 2001

(65) Prior Publication Data

US 2003/0123208 A1 Jul. 3, 2003

(51) Int. Cl.[7] .................................. H02H 1/04
(52) U.S. Cl. ................... 361/119; 361/91.1; 361/111; 361/56
(58) Field of Search .................. 361/56, 91.1, 111, 361/118, 127, 119

(56) References Cited

U.S. PATENT DOCUMENTS

| | | | | |
|---|---|---|---|---|
| 4,282,555 A | * | 8/1981 | Svedberg .................. 361/56 |
| 4,695,916 A | * | 9/1987 | Satoh et al. ............... 361/56 |
| 4,941,063 A | * | 7/1990 | McCartney et al. ........ 361/119 |
| 5,623,388 A | * | 4/1997 | Chaudhry .................. 361/119 |
| 5,675,468 A | * | 10/1997 | Chang ...................... 361/119 |
| 5,677,820 A | * | 10/1997 | Pelegris .................... 361/119 |
| 5,841,620 A | * | 11/1998 | Masghati ................... 361/119 |
| 5,883,775 A | * | 3/1999 | Maytum .................... 361/119 |
| 6,072,683 A | * | 6/2000 | Masghati ................... 361/119 |
| 6,385,030 B1 | * | 5/2002 | Beene ...................... 361/119 |
| 6,421,220 B2 | * | 7/2002 | Kobsa ...................... 361/120 |

FOREIGN PATENT DOCUMENTS

| | | | |
|---|---|---|---|
| DE | 3422995 C1 | 11/1985 | ......... H04M/3/18 |
| EP | 0490788 A1 | 6/1992 | ......... H02H/9/04 |
| WO | WO99/62158 | 12/1999 | ......... H02H/3/22 |

* cited by examiner

*Primary Examiner*—Bao Q. Vu
(74) *Attorney, Agent, or Firm*—Christopher C. Dremann

(57) ABSTRACT

An apparatus and method for reducing and balancing the off-state capacitance of an overvoltage protection circuit utilizes one or more diode networks electrically connected in series with an overvoltage protection device. The overvoltage protection device is selected from the group consisting of a gas tube, an MOV, a transient voltage suppressor (TVS) diode and a TVS thyristor. Preferably, the overvoltage protection device is a solid-state overvoltage protector (SSOVP) having at least one thyristor. The diode network includes a plurality of diodes electrically connected in parallel and arranged with opposing polarities so that the circuit is bi-directional. Preferably, the diode network includes a first set of two or more stacked diodes electrically connected in parallel with a second set of two or more stacked diodes and arranged with opposing polarities, and the capacitance of the diode network is less than the capacitance of the thyristor.

15 Claims, 6 Drawing Sheets

APPARATUS AND METHOD FOR REDUCING AND BALANCING THE CAPACITANCE OF OVERVOLTAGE PROTECTOR IN HIGH FREQUENCY TRANSMISSIONS

FIELD OF THE INVENTION

The invention relates generally to overvoltage protectors and, more particularly, to reducing and balancing the capacitance of an overvoltage protector in high frequency transmissions.

BACKGROUND OF THE INVENTION

Signal-carrying transmission lines, such as telephone lines connected to computer modems for high frequency data transmissions, are subject to high voltage surges resulting from a lightning strike or AC power transient. Therefore, it is often necessary to provide telephone lines with surge protection devices to protect people and equipment connected to the transmission line from transient voltage and current surges. Surge protection devices that are shunt-connected are generally either clamping devices or crowbar devices. Under normal operating conditions, a clamping device acts as a high-impedance path to a protected transmission line. Ideally, a clamping device behaves as an open circuit. In actuality, however, a small amount of current may leak through the clamping device along the transmission line. When a transient voltage exceeds the normal operating voltage of the transmission line, the device behaves as a low-impedance path. Clamping devices automatically return to a high-impedance state when the line voltage returns to a normal operating level. A crowbar device begins to break down with a positive resistance until the device reaches a break-over voltage. Upon reaching the break-over voltage, the device "snaps" back to a low on-state voltage. The low on-state voltage means that the device dissipates less power, and thus, provides a higher surge current handling capability than does a clamping device. A disadvantage of a crowbar device is that the current through the device must fall below a specified holding current for the device to return to a non-conducting state.

Available technologies for parallel protection elements include gas-discharge/surge arrestors (also known as "gas tubes"), metal oxide varistors (MOVs), and solid-state devices. Examples of solid state protection devices include transient voltage suppressor (TVS) diodes and TVS thyristors. MOVs and TVS diodes operate as clamping devices, whereas gas tubes and TVS thyristors operate as crowbar devices. The use of gas tubes, MOVs, diodes and thyristors in surge protection has been a popular method for preventing injury to people and damage to equipment caused by an accidental overvoltage. Since telephone lines may be used for high-frequency data transmissions, an overvoltage protector utilizing thyristors, for example triacs, may interfere with the high frequency operation of telephone lines. Normally, telephone line overvoltage protectors are designed to protect against induced AC voltage and voltage spikes caused by lightning and power line switching. Thus, conventional overvoltage protectors utilizing thyristors are not optimized to reduce interference with the high frequency operation of telephone lines. In fact, the problems typically encountered with thyristors are: 1) an unacceptably high off-state capacitance; and 2) the capacitance varies significantly with DC bias voltage, causing excessive imbalance for high frequency transmissions. This high off-state capacitance and imbalance causes excessive attenuation and reflection at high frequencies, and thereby, interferes with high frequency transmissions over telephone lines.

For example, frequencies of up to about 30 megahertz are employed over telephone lines utilizing digital subscriber line (DSL) technology for data transmissions. An overvoltage protector utilizing thyristors has an off-state capacitance in high frequency transmissions from about 70 to about 200 picofarads (pfd). This fairly high off-state capacitance causes impedance mismatches on the twisted pair telephone line, which typically results in excessive signal attenuation and reflection (i.e., return loss) at high frequencies. Moreover, an overvoltage protector utilizing thyristors has unbalanced tip-to-ground and ring-to-ground capacitance characteristics in high frequency operation, since such high frequency characteristics are typically not considered in the design of the protector. In addition, the capacitance of individual thyristors will vary exponentially with DC voltages found on transmission lines, thereby increasing the need to balance the tip-to-ground and ring-to-ground capacitance between the twisted pair on the telephone line.

It is therefore desirable in an overvoltage protector on a telephone line to have a relatively low off-state capacitance as measured between the tip and ring wires as well as a substantially balanced tip-to-ground capacitance and ring-to-ground capacitance. As will be readily appreciated by those of skill in the art, reducing the tip-to-ground capacitance and/or the ring-to-ground capacitance will necessarily reduce the overall off-state capacitance of the overvoltage protector. As used herein, the term "overall off-state capacitance" refers to the capacitance of the overvoltage protection circuit as measured between the tip and ring wires. In view of the above-noted deficiencies, it is apparent that there exists a specific need for an apparatus and method for reducing and balancing the capacitance of an overvoltage protector in high frequency transmissions.

BRIEF SUMMARY OF THE INVENTION

The present invention provides an apparatus and method for reducing and balancing the capacitance of an overvoltage protector in high frequency transmissions. More specifically, the present invention provides an overvoltage protection circuit having a reduced off-state capacitance so that the circuit may be used to protect signal-carrying transmission lines transmitting data at high frequencies, for example telephone lines utilizing digital subscriber line (DSL) technology. At the same time, the present invention also provides an overvoltage protection circuit having a substantially balanced off-state capacitance.

In a particular embodiment, the apparatus is an overvoltage protection circuit including a first overvoltage protection device and a first diode network electrically connected in series between a first electrical conductor and an electrical ground. The apparatus further includes a second overvoltage protection device and may include a second diode network electrically connected in series between a second electrical conductor and the electrical ground. The first overvoltage protection device and the second overvoltage protection device are preferably selected from the group consisting of a gas tube, an MOV, a TVS diode, and a TVS thyristor. If the first and second overvoltage protection devices are solid state overvoltage protectors, they may be integrated with the first and second diode networks onto a common semiconductor chip. The first diode network includes at least one pair of diodes electrically connected in parallel and arranged with opposing polarities so that the electrical currents flowing between the first electrical conductor and the electrical ground are bi-directional. Preferably, the first diode network includes two sets of two or more stacked diodes electrically connected in parallel and arranged with opposing polarities so that the electrical currents flowing between the first electrical conductor and the electrical ground are bi-directional. The second diode network may be configured the same or differently (e.g., for protection at a subscriber premises) than the first diode network, or may be eliminated from the circuit altogether (e.g., for protection at a telephone company central office) depending on the different capacitances of the first and the second overvoltage protection devices caused by voltage bias.

In another particular embodiment, the invention is a method for reducing and balancing the off-state capacitance of an overvoltage protection circuit. The method includes the first step of electrically connecting a first overvoltage protection device to a first diode network in series between a first electrical conductor and an electrical ground. The method may include the second step of electrically connecting a second overvoltage protection device to a second diode network in series between a second electrical conductor and the electrical ground. The first overvoltage protection device and the second overvoltage protection device are preferably selected from the group consisting of a gas tube, an MOV, a TVS diode, and a TVS thyristor. If the first and second overvoltage protection devices are solid state overvoltage protectors, they may be integrated with the first and second diode networks onto a common semiconductor chip. The first diode network includes at least one pair of diodes electrically connected in parallel and arranged with opposing polarities so that the electrical currents flowing between the first electrical conductor and the electrical ground are bi-directional. Preferably, the first diode network includes two sets of two or more stacked diodes electrically connected in parallel and arranged with opposing polarities so that the electrical currents flowing between the first electrical conductor and the electrical ground are bi-directional. The second diode network may be configured the same or differently (e.g., for protection at a subscriber premises) than the first diode network, or may be eliminated from the circuit altogether (e.g., for protection at a telephone company central office) depending on the different capacitances of the first and the second overvoltage protection devices caused by voltage bias.

BRIEF DESCRIPTION OF THE DRAWINGS

The present invention will be described in conjunction with the accompanying drawings in which like reference numerals represent the same or similar elements in the various views. The drawings, which are incorporated in and constitute a part of this specification, provide further understanding of the invention, illustrate various embodiments of the invention, and, together with the description, fully explain the principles and objectives thereof. More specifically.

DETAILED DESCRIPTION OF VARIOUS EMBODIMENTS OF THE INVENTION

The present invention is described more fully hereinafter with reference to the accompanying drawings, in which various embodiments of the invention are shown. The invention, however, may be embodied in many different forms, and therefore, should not be construed as being limited to the various embodiments described and shown herein. Illustrative embodiments are set forth herein so that this description will be thorough and complete, and will fully convey the intended scope of the invention, while enabling those skilled in the art to make and practice the invention without undue experimentation.

Figure 1:
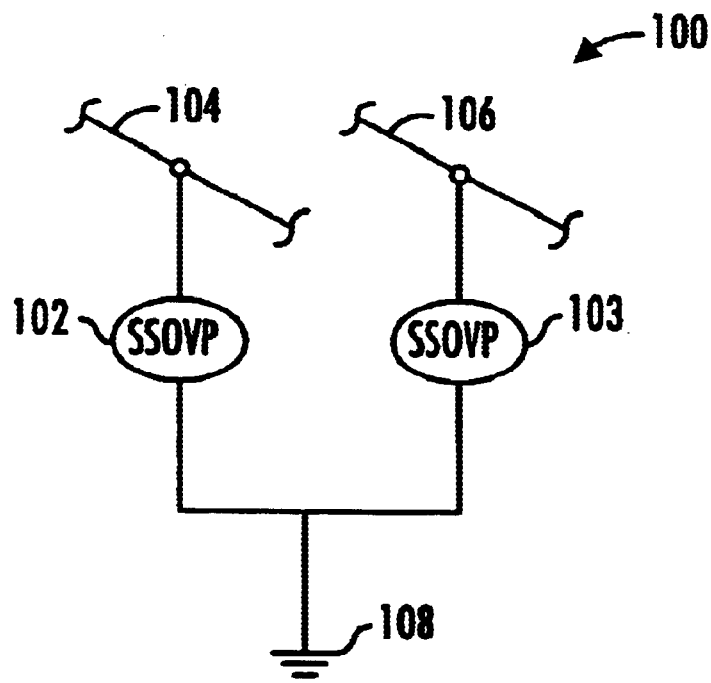
FIG. 1 is a wiring diagram of a prior art overvoltage protection circuit utilizing solid state overprotection devices.

Referring now to the accompanying drawings, FIG. 1 is a wiring diagram of a prior art overvoltage protection circuit, indicated generally at 100. The overvoltage protection circuit 100 comprises a solid-state overvoltage protector (SSOVP) 102 electrically connected between a first electrical conductor 104 and an electrical ground 108, and a second SSOVP 103 electrically connected between a second electrical conductor 106 and the ground 108. The first electrical conductor 104 and the second electrical conductor 106 may, for example, be a telephone tip wire and a telephone ring wire, respectively. The first SSOVP 102 and the second SSOVP 103 may be integrated into a common circuit on a semiconductor chip having at least one transient voltage suppressor (TVS) thyristor, such as a triac, in a known manner. The construction and operation of an SSOVP is well known in the art, and therefore, will not be discussed in further detail herein, except insofar as necessary to adequately disclose and enable the present invention.

As previously discussed, a thyristor typically has a relatively high off-state capacitance, for example, as much as about 200 picofarads (pfd). This capacitance is unacceptable in high frequency transmissions because the capacitive impedance is inversely proportional to the capacitance multiplied by the operating frequency. Therefore, a capacitance of even only a few hundred picofarads will significantly affect the characteristics of an overvoltage protection circuit in high frequency operation. Since a telephone line may utilize digital subscriber line (DSL) technology to transmit data at high frequency, the high off-state capacitance of the SSOVP 102 adversely affects signal transmissions over the telephone line. The overall capacitance of the circuit 100 as measured between the tip wire and the ring wire is given by $C_C = (C1 \times C2)/(C1+C2)$. The imbalance of the circuit 100 between the tip-to-ground capacitance and the ring-to-ground capacitance is given by $I_C = C1 - C2$. For example, if the tip-to-ground capacitance of the SSOVP 102 is 150 picofarads (pfd) and the ring-to-ground capacitance of the SSOVP 103 is also 150 picofarads (pfd), then the overall capacitance of the circuit 100 as measured between the tip wire and the ring wire is $(150 \times 150)/(150+150)$, or 75 picofarads (pfd). The imbalance of the circuit 100 between the tip-to-ground capacitance and the ring-to-ground capacitance is, of course, (150−150), or 0 picofarads (pfd).

Figure 2:
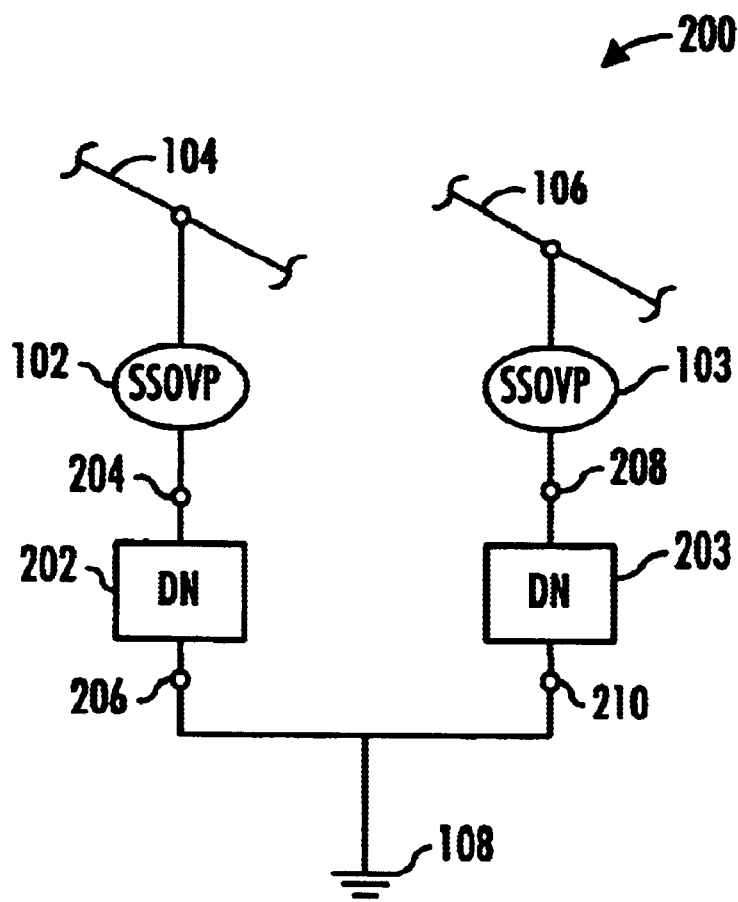
FIG. 2 is a wring diagram of an overvoltage protection circuit utilizing solid state overprotection devices and diode networks electrically connected in series according to the present invention.

Referring to FIG. 2, the reference numeral 200 designates an overvoltage protection circuit constructed in accordance with the present invention. As depicted, the circuit 200 may be a protection circuit located at a subscriber premises (e.g., a station protector) or a protection circuit located at a telephone company central office (e.g., a central office protector). The circuit 200 is similar to the circuit 100, but further includes a first diode network 202 connected to terminals 204 and 206 in series between the SSOVP 102 and the ground 108. Preferably, the circuit 200 also further includes a second diode network 203 connected to terminals 208 and 210 in series between the SSOVP 103 and the ground 108. While the SSOVP 102 and the SSOVP 103 are preferred for use as the overvoltage protection devices in the present invention, other types of overvoltage protection devices may be used, such as gas tubes or metal oxide varistors (MOVs). The first diode network 202 and the second diode network 203 are electrically connected in series with the SSOVP 102 and the SSOVP 103, respectively, to reduce the capacitance of the circuit 200 as measured between the first and second electrical conductors 104 and 106, while at the same time improving the balance of the capacitance between the first electrical conductor 104 and the ground 108 with the capacitance between the second electrical conductor 104 and the ground 108. The first diode network 202 and the SSOVP 102 may be integrated into a common circuit on a semiconductor chip. Similarly, the second diode network 203 and the SSOVP 103 may be integrated into a common circuit on a semiconductor chip, or may be combined with the first diode network 202 and the SSOVP 102 into a common circuit on a semiconductor chip.

The first diode network 202 and the second diode network 203 are typically, although not necessarily, configured the same. Accordingly, the circuit 200 will be described in greater detail below with respect to only the first diode network 202, it being understood that the second diode network 203 typically will be configured in the same manner except as noted. The first diode network 202 comprises a plurality of diodes having sufficient current handling capability and speed for the desired application. For example, the commercially available 1N4007 1.0 Ampere general purpose rectifier may be suitable for a particular application. If used, the leads of the 1N4007 rectifiers are electrically connected and inserted into the circuit 200 between the terminals 204 and 206. Although the use of such rectifiers is feasible, it is typically impractical to physically connect the leads of commercially available "off-the-shelf" diodes together in an overvoltage protector due to space limitations. Furthermore, physically connecting the leads of the diodes together introduces stray capacitance and inductance into the circuit. Accordingly, it is preferred in the present invention to fabricate the diode network 202 by stacking the diodes on a semiconductor die and inserting the "stacked" diode network 202 into the circuit 200 between the terminals 204 and 206. As used herein, the term "stacked diode network" refers to a plurality of diodes electrically connected and mounted on a semiconductor die in a predetermined arrangement. The stacked diode network is thus compact enough for insertion into an overvoltage protection circuit of the type utilized in a subscriber premises or telephone company central office overvoltage protector and does not introduce a significant amount of stray capacitance or inductance.

Figure 3:
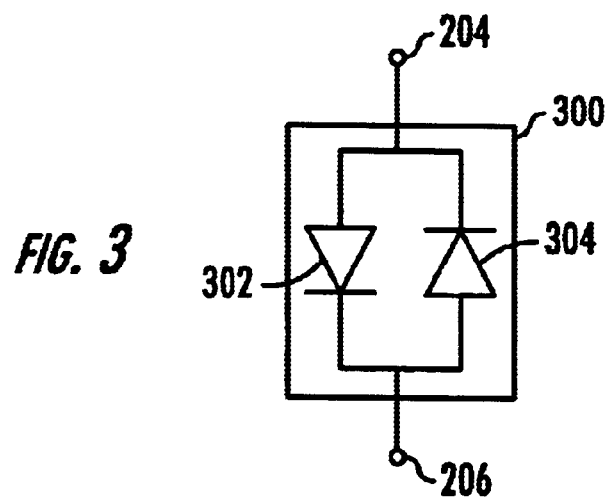
FIG. 3 is a wiring diagram depicting a first example of a diode network that may be utilized in the overvoltage protection circuit of FIG. 2.

FIG. 3 depicts a first example of a diode network 300 that may be configured to constitute the diode network 202 of FIG. 2. The diode network 300 preferably comprises a single pair of substantially similar diodes 302 and 304 connected in parallel and arranged with opposing polarities so that the circuit 200 may operate bi-directionally. While it is preferable that the diodes 302 and 304 be substantially similar, they may also be dissimilar. For example, the diodes 302 and 304 may be different from each other in their on-state current levels and/or their off-state capacitances, as long as the diode network 202 has surge impulse and high frequency characteristics that are acceptable to the design requirements of the circuit 200. Such design requirements may include, for example: 1) low tip-to-ground and ring-to-ground capacitance and balance therebetween; 2) the appropriate surge impulse characteristic of the circuit 200 as a surge protector; and 3) an overall off-state capacitance of the circuit 200 that is low enough not to disturb signal transmissions over the first electrical conductor 104 and the second electrical conductor 106 at a given frequency. The level of acceptable off-state capacitance of the circuit 200 is determined by a number of factors, including the operating frequency of a signal carried over the first electrical conductor 104 and the second electrical conductor 106.

Figure 4:
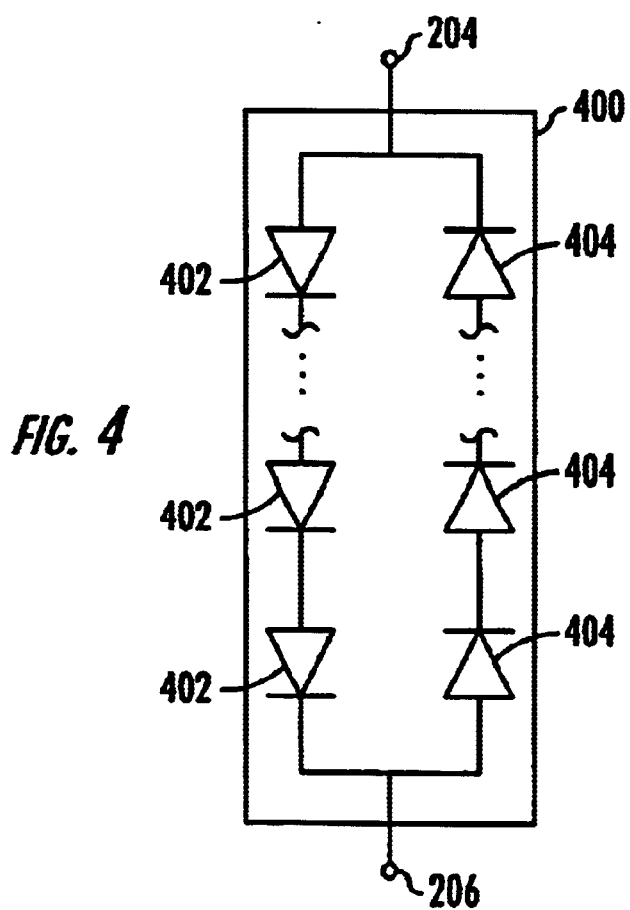
FIG. 4 is a wiring diagram depicting a second example of a diode network that may be utilized in the overvoltage protection circuit of FIG. 2.

As will be readily understood and appreciated by those of skill in the art, the exemplary diode network 300 depicted in FIG. 3 is only suitable for reducing and balancing the capacitance of an overvoltage protector in limited circumstances. In particular, the diode network 300 may only be suitable for reducing and balancing the capacitance of an overvoltage protection circuit having a low capacitance thyristor that is located at a subscriber premises. In most instances, a diode network having multiple stacked diodes will be required to significantly reduce and balance the capacitance of the overvoltage protection circuit. FIG. 4 depicts a second example of a diode network 400 that may configured to constitute the diode network 202 of FIG. 2. The diode network 400 comprises a first set of multiple, substantially similar, stacked diodes 402 electrically connected in parallel with a second set of multiple, substantially similar, stacked diodes 404. The stacked diodes 402 and 404 are arranged with opposing polarities so that the circuit 200 may operate bi-directionally. While it is preferable that the number of diodes in each set of stacked diodes 402 and 404 be equal, the number of diodes may also be unequal, as long as the diode network 202 has surge impulse and high frequency characteristics that are acceptable to the design requirements of the circuit 200, as previously described.

Figure 5:
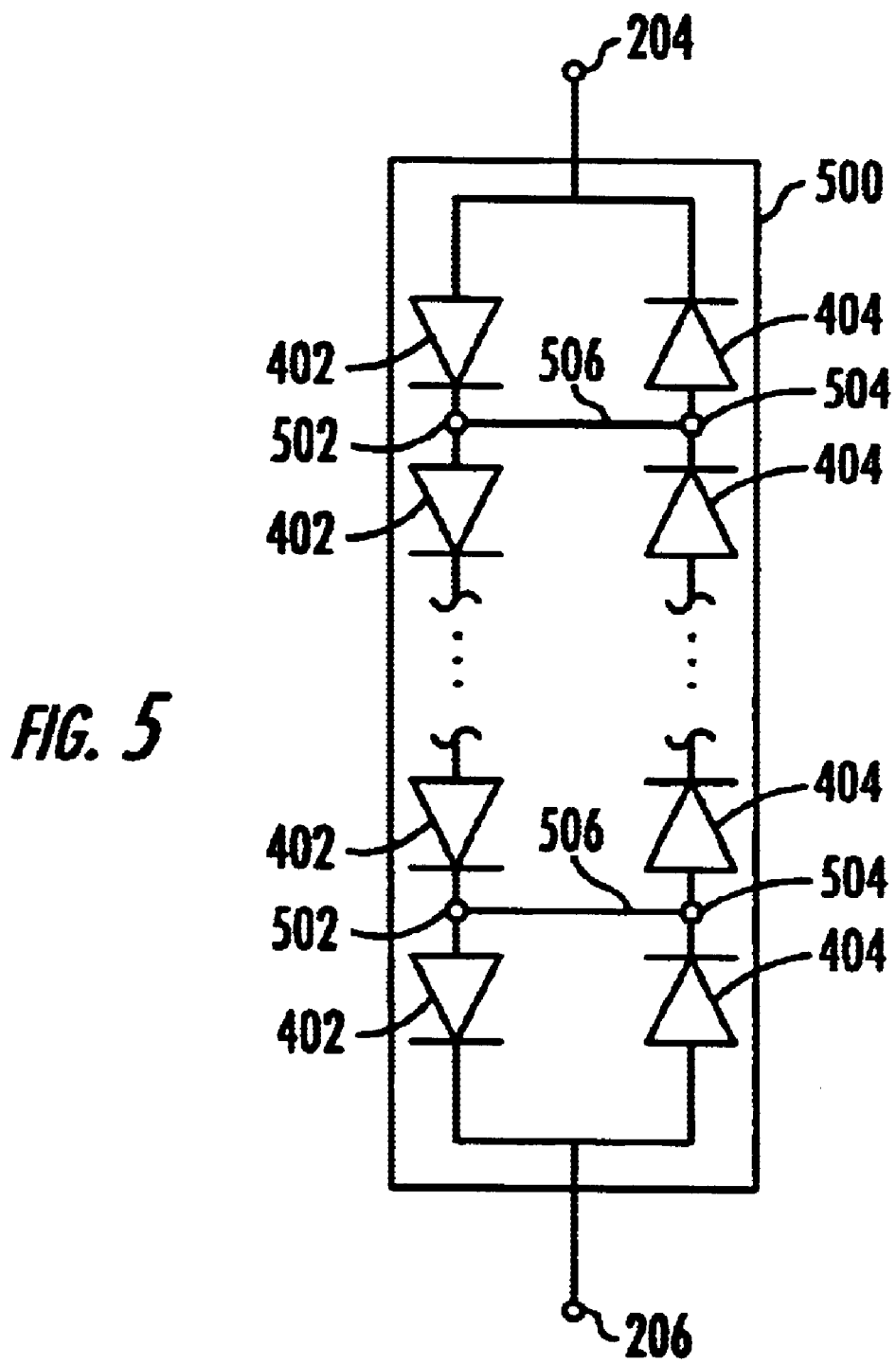
FIG. 5 is a wring diagram depicting a third example of a diode network that may be utilized in the overvoltage protection circuit of FIG. 2.

FIG. 5 depicts a third example of a diode network 500 that may configured to constitute the diode network 202 of FIG. 2. The diode network 500 is similar to the diode network 400 described above with respect to FIG. 4, but further comprises one or more shunt lines 506 connecting the stacked diodes 402 and 404 across terminals 502 and 504. Each terminal 502 represents a serial connection between two adjacent diodes of the first set of stacked diodes 402. Similarly, each terminal 504 represents a serial connection point two adjacent diodes of the second set of staked diodes 404. Each shunt line 506 electrically connects a terminal 502 with a corresponding terminal 504. While it is possible, as shown in the example depicted in FIG. 5, that one or more shunt lines 506 interconnect each and every terminal 502 with a corresponding terminal 504, in an alternative embodiment, one or more shunt lines 506 may interconnect only selected terminals 502 and 504. In other words, fewer than all of the terminals 502 may be interconnected with corresponding terminals 504. For example, stacked diodes 402 and stacked diodes 404 may each comprise three diodes and there may be zero, one, or two shunt lines 506 interconnecting the two terminals 502 with the corresponding terminals 504 at zero, one, or two randomly selected positions. It will be readily appreciated by those of ordinary skill in the art that the diode network 500 may be configured in a number of different ways, depending on the number of diodes utilized in the stacked diodes 402 and 404, and the number and location of the shunt lines 506.

In the operation of the present invention, when either of diode networks 400 or 500 described above and depicted in FIGS. 4 and 5 constitutes diode networks 202 and 203, the overall off-state capacitance of the overvoltage protection circuit 200 is significantly reduced in high frequency transmissions. However, diode networks 400 and 500 should not at the same time significantly diminish the effectiveness of the overvoltage protection devices SSOVP 102 or SSOVP 103 in circuit 200. A nominal voltage drop will normally result across the diode network 202, which may readily be taken into account when the circuit 200 is designed. For example, in the circuit 200 of FIG. 2, a predictable voltage drop will result across the diode network 202 when the diodes of the diode network 202 are excited. This voltage drop will be either negligible or compensated by use of an SSOVP 102 having a lower break-over voltage. In addition to reducing the overall off-state capacitance of the overvoltage protection circuit 200 in high frequency transmissions, the invention also substantially balances the capacitance of the circuit 200. In particular, the use of the stacked diode networks 202 and 203 improves the imbalance of the capacitance between the first electrical conductor 104 and the ground 108 and the capacitance between the second electrical conductor 106 and the ground 108. The following examples of an overvoltage protection circuit 200 constructed in accordance with the invention illustrate how the addition of the stacked diode networks 202 and 203 to the circuit 200 significantly reduces the overall off-state capacitance of the circuit, and at the same time substantially balances the capacitance between the first electrical conductor 104 and the ground 108 and between the second electrical conductor 106 and the ground 108.

Figure 6A:
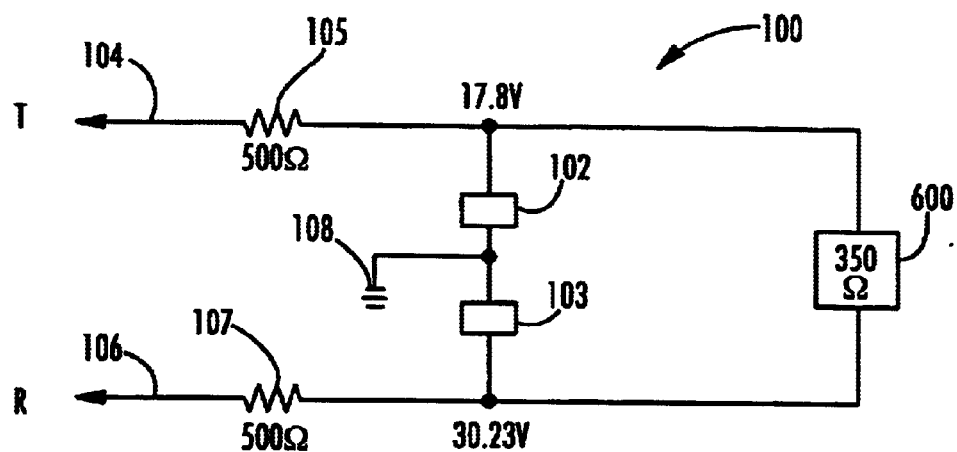
FIG. 6a is a wring diagram illustrating an overvoltage protection circuit for protection at a subscriber premises that does not include a diode network according to the invention.
Figure 6B:
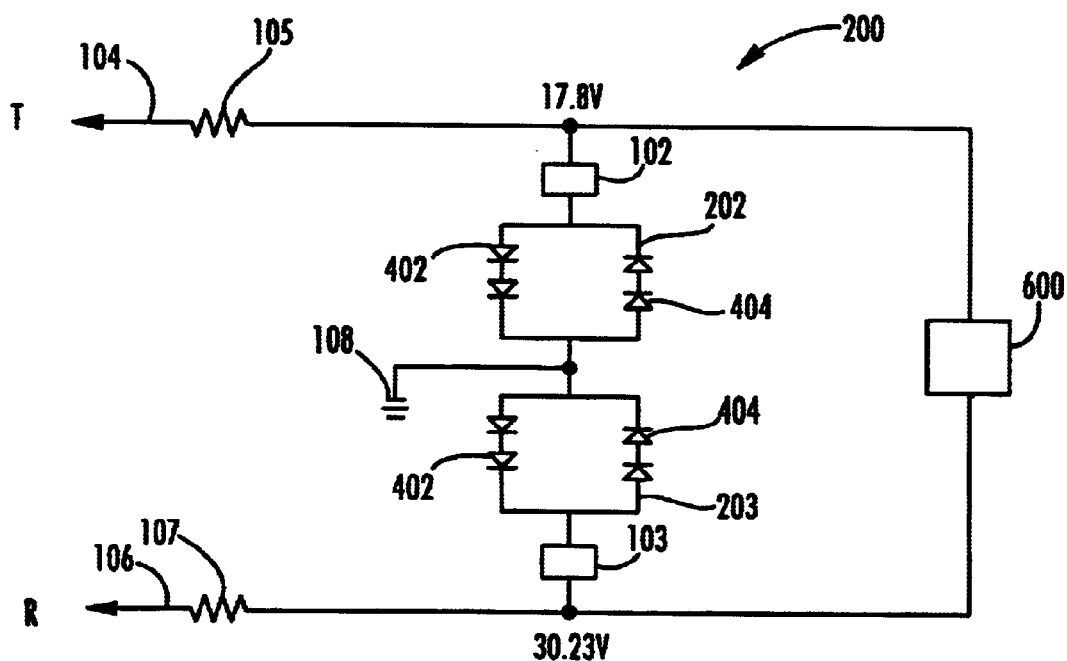
FIG. 6b is a wring diagram illustrating an overvoltage protection circuit for protection at a subscriber premises that includes a diode network according to the invention to reduce and balance the capacitance of an overvoltage protector in high frequency transmissions.

In a first example illustrated in FIGS. 6a and 6b, a typical transmission line at a subscriber premises, such as a telephone line utilizing DSL technology, comprises a first electrical conductor 104 consisting of a tip wire and a second electrical conductor 106 consisting of a ring wire electrically connected to subscriber equipment 600, such as a DSL modem for receiving and transmitting high frequency data.

The loop resistance 105 on the tip wire 104 between the telephone company central office and the overvoltage protector at the subscriber premises is about 500 ohms. Similarly, the loop resistance 107 on the ring wire 106 between the telephone company central office and the overvoltage protector at the subscriber premises is about 500 ohms. The subscriber equipment 600 has a resistance of about 350 ohms. As a result, the voltage on the tip wire 104 at SSOVP 102 is about 17.8 volts and the voltage on the ring wire 106 at SSOVP 103 is about 30.23 volts. An overvoltage protection circuit 100 is configured on the telephone line to protect the subscriber equipment 600 against induced AC voltage and voltage spikes on the telephone line caused by lightning and power switching. The overvoltage protection circuit 100 comprises a first SSOVP 102, consisting of a thyristor having a capacitance of 150 picofarads (pfd), electrically connected between the tip wire 104 and an electrical ground 108. The overvoltage protection circuit 100 further comprises a second SSOVP device 103, consisting of a thyristor having a capacitance of 140 picofarads (pfd), electrically connected between the ring wire 106 and the ground 108. Thus, the total tip-to-ground capacitance of the circuit 100 is 150 picofarads (pfd) and the total ring-to-ground capacitance of the circuit 100 is 140 picofarads (pfd). The overall off-state capacitance of the overvoltage protection circuit 100 is therefore (150×140)/(150+140), or 72.4 picofarads (pfd). Furthermore, the imbalance between the tip-to-ground capacitance and the ring-to-ground capacitance of the overvoltage protection circuit 100 is (150−140), or 10 picofarads (pfd).

As shown in FIG. 6b, an overvoltage protection circuit 200 is configured by adding diode network 202 electrically in series between the thyristor 102 and the ground 108 and adding diode network 203 electrically in series between the thyristor 103 and the ground 108. In the illustrated embodiment, diode network 202 consists of a plurality of diodes comprising a first set of two or more stacked diodes 402 electrically connected in parallel with a second set of two or more stacked diodes 404. The first and second sets of stacked diodes 402 and 404 are arranged with opposing polarities such that the diode network 202 has a capacitance of 20 picofarads (pfd). Similarly, the diode network 203 consists of a plurality of diodes comprising a first set of two or more stacked diodes 402 electrically connected in parallel with a second set of two or more stacked diodes 404. The first and second sets of stacked diodes 402 and 404 are arranged with opposing polarities such that the diode network 203 has a capacitance of 20 picofarads (pfd). Thus, the total tip-to-ground capacitance of the circuit 200 is (150×20)/(150+20), or 17.65 picofarads (pfd) and the total ring-to-ground capacitance of the circuit 200 is (140×20)/(140+20), or 17.5 picofarads (pfd). The overall off-state capacitance of the overvoltage protection circuit 200 is therefore (17.65×17.5)/(17.65+17.5), or 8.8 picofarads (pfd). Furthermore, the imbalance between the tip-to-ground capacitance and the ring-to-ground capacitance of the overvoltage protection circuit 200 is (17.65−17.5), or 0.15 picofarads (pfd). Thus, the addition of the stacked diode networks 202 and 203 reduces the overall off-state capacitance of the circuit 200 from 72.4 to 8.8 picofarads (pfd) and improves the imbalance between the tip-to-ground capacitance and the ring-to-ground capacitance of the circuit 200 from 10 to 0.15 picofarads (pfd) for high frequency transmissions.

Figure 7A:
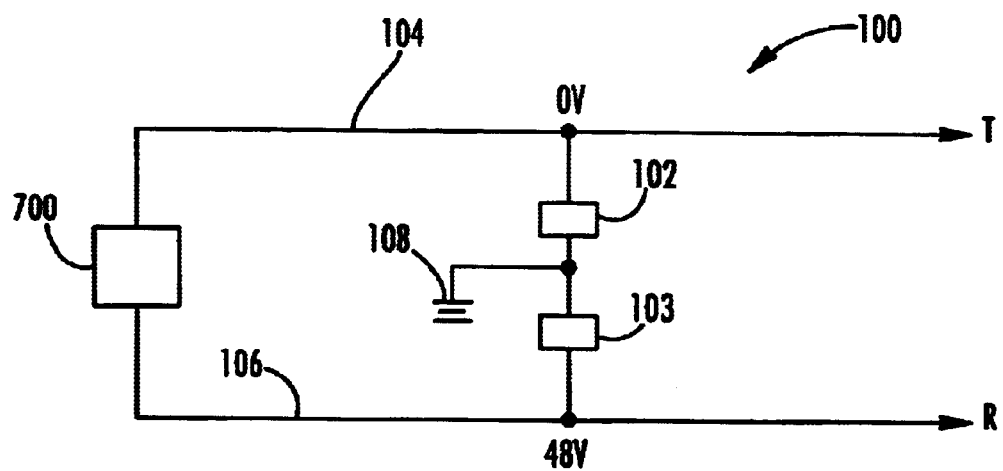
FIG. 7a is a wring diagram illustrating an overvoltage protection circuit for protection at a telephone company central office that does not include a diode network according to the invention.
Figure 7B:
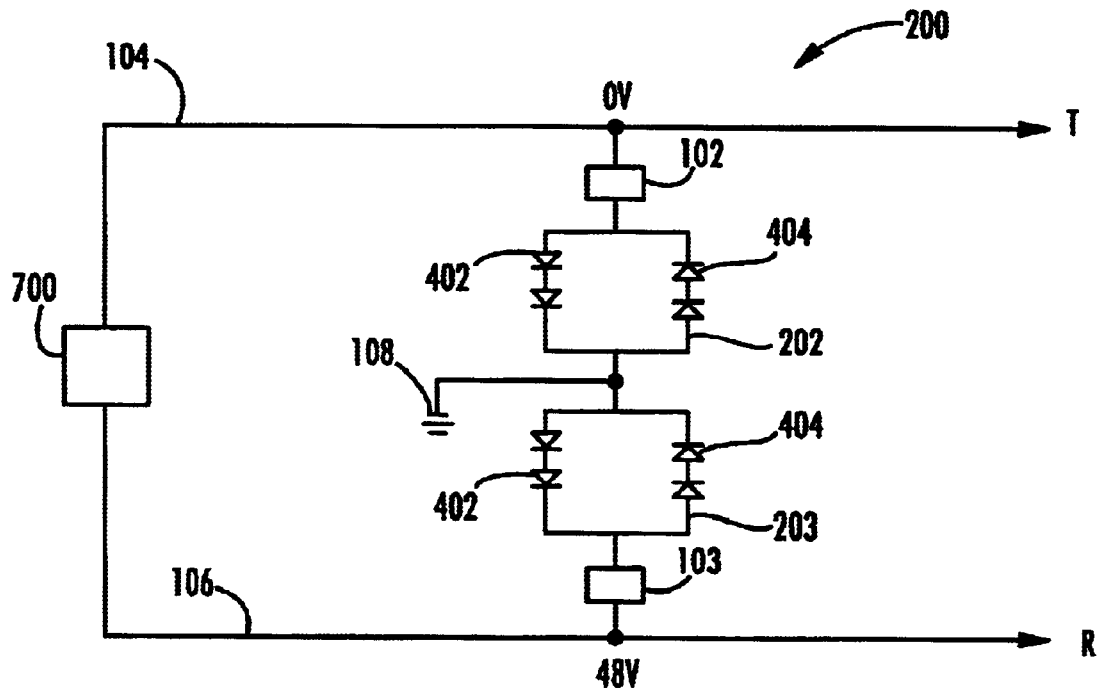
FIG. 7b is a wring diagram illustrating an overvoltage protection circuit for protection at a telephone company central office that includes a diode network according to the invention to reduce and balance the capacitance of an overvoltage protector in high frequency transmissions.

In a second example illustrated in FIGS. 7a and 7b, a typical transmission line at a telephone company central office, such as a telephone line utilizing DSL technology, comprises a first electrical conductor 104 consisting of a tip wire and a second electrical conductor 106 consisting of a ring wire electrically connected to telephone company equipment 700, such as a DSL modem for receiving and transmitting high frequency data. Because the overvoltage protector is located at a telephone company central office, the voltage on the tip wire 104 at the SSOVP 102 is about 0 volts and the voltage on the ring wire 106 at the SSOVP 103 is about 48 volts. An overvoltage protection circuit 100 is configured on the telephone line to protect the telephone company equipment 700 against induced AC voltage and voltage spikes on the telephone line caused by lightning and power switching. The overvoltage protection circuit 100 comprises a first SSOVP 102, consisting of a thyristor having a capacitance of 160 picofarads (pfd), electrically connected between the tip wire 104 and an electrical ground 108. The overvoltage protection circuit 100 further comprises a second SSOVP 103, consisting of a thyristor having a capacitance of 110 picofarads (pfd), electrically connected between the ring wire 106 and the ground 108. Thus, the total tip-to-ground capacitance of the circuit 100 is 160 picofarads (pfd) and the total ring-to-ground capacitance of the circuit 100 is 110 picofarads (pfd). The overall off-state capacitance of the overvoltage protection circuit 100 is therefore (160×110)/(160+110), or 65.2 picofarads (pfd). Furthermore, the imbalance between the tip-to-ground capacitance and the ring-to-ground capacitance of the overvoltage protection circuit 100 is (160–110), or 50 picofarads (pfd).

As shown in FIG. 7b, an overvoltage protection circuit 200 is configured by adding diode network 202 electrically in series between the thyristor 102 and an electrical ground 108 and adding diode network 203 electrically in series between the thyristor 103 and the ground 108. In the illustrated example, diode network 202 consists of a plurality of diodes comprising a first set of two or more stacked diodes 402 electrically connected in parallel with a second set of two or more stacked diodes 404. The first and second sets of stacked diodes 402 and 404 are arranged with opposing polarities such that the diode network 202 has a capacitance of 20 picofarads (pfd). Similarly, the diode network 203 consists of a plurality of diodes comprising a first set of two or more stacked diodes 402 electrically connected in parallel with a second set of two or more sacked diodes 404. The first and second sets of stacked diodes 402 and 404 are arranged with opposing polarities such that the diode network 203 has a capacitance of 20 picofarads (pfd). Thus, the total tip-to-ground capacitance of the circuit 200 is (160×20)/(160+20), or 17.8 picofarads (pfd) and the total ring-to-ground capacitance of the circuit 200 is (110×20)/(110+20), or 16.9 picofarads (pfd). The overall off-state capacitance of the overvoltage protection circuit 200 is therefore (17.8×16.9)/(17.8+16.9), or 8.7 picofarads (pfd). Furthermore, the imbalance between the tip-to-ground capacitance and the ring-to-ground capacitance of the overvoltage protection circuit 200 is (17.8–16.9), or 0.9 picofarads (pfd). Thus, the addition of the stacked diode networks 202 and 203 reduces the overall off-state capacitance of the circuit 200 from 65.2 to 8.7 picofarads (pfd) and improves the imbalance between the tip-to-ground capacitance and the ring-to-ground capacitance of the circuit 200 from 50 to 0.9 picofarads (pfd) for high frequency transmissions.

Figure 8A:
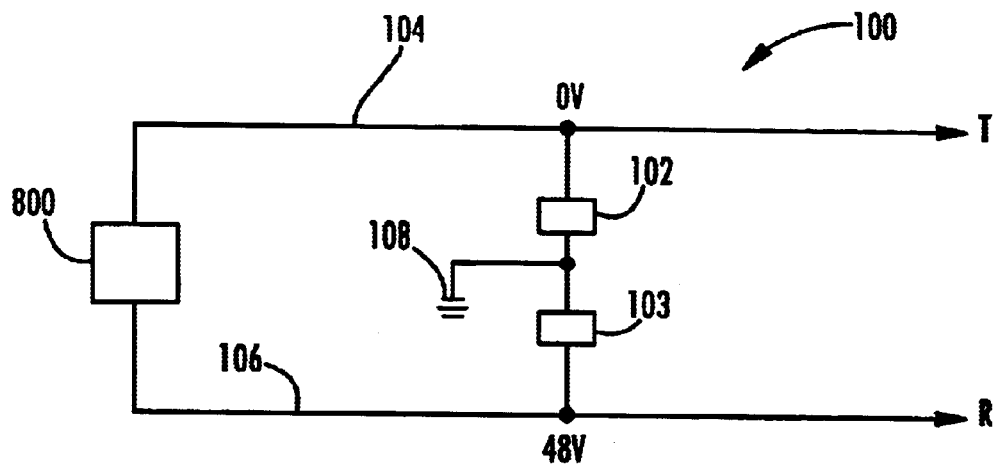
FIG. 8a is a wring diagram illustrating an overvoltage protection circuit with a low capacitance thyristor for protection at a telephone company central office that does not include a diode network according to the invention.
Figure 8B:
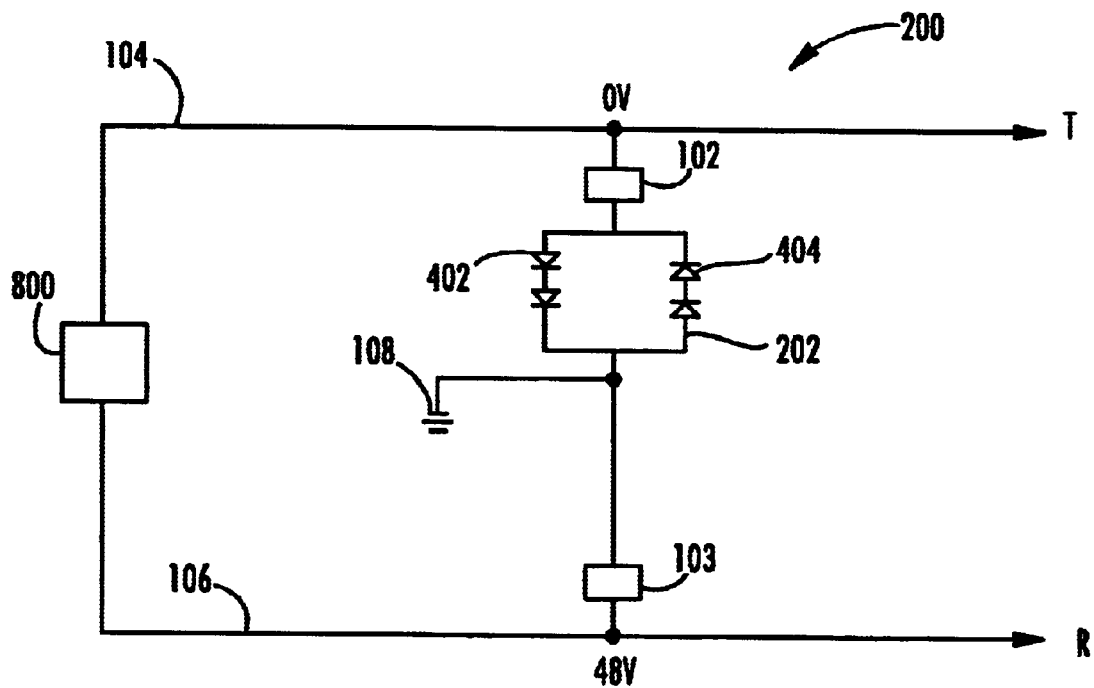
FIG. 8b is a wring diagram illustrating an overvoltage protection circuit with a low capacitance thyristor for protection at a telephone company central office that includes a diode network according to the invention to reduce and balance the capacitance of an overvoltage protector in high frequency transmissions.

In a third example illustrated in FIGS. 8a and 8b, a typical transmission line at a telephone company central office, such as a telephone line utilizing DSL technology, comprises a first electrical conductor 104 consisting of a tip wire and a second electrical conductor 106 consisting of a ring wire electrically connected to telephone company equipment 800, such as a DSL modem for receiving and transmitting high frequency data. Because the overvoltage protector is located at a telephone company central office, the voltage on the tip wire 104 at the SSOVP 102 is about 0 volts and the voltage on the ring wire 106 at the SSOVP 103 is about 48 volts. An overvoltage protection circuit 100 having a low capacitance thyristor is configured on the telephone line to protect the telephone company equipment 800 against induced AC voltage and voltage spikes on the telephone line caused by lightning and power switching. The overvoltage protection circuit 100 comprises a first SSOVP 102, consisting of a thyristor having a capacitance of 60 picofarads (pfd), electrically connected between the tip wire 104 and an electrical ground 108. The overvoltage protection circuit 100 further comprises a second SSOVP 103, consisting of a thyristor having a capacitance of only 25 picofarads (pfd), electrically connected between the ring wire 106 and the ground 108. Thus, the total tip-to-ground capacitance of the circuit 100 is 60 picofarads (pfd) and the total ring-to-ground capacitance of the circuit 100 is 25 picofarads (pfd). The overall off-state capacitance of the overvoltage protection circuit 100 is therefore (60×25)/(60+25), or 17.64 picofarads (pfd). Furthermore, the imbalance between the tip-to-ground capacitance and the ring-to-ground capacitance of the overvoltage protection circuit 100 is (60–25), or 35 picofarads (pfd).

As shown in FIG. 8b, an overvoltage protection circuit 200 is configured by adding diode network 202 electrically in series between the thyristor 102 and an electrical ground 108. As a result of the already low capacitance of thyristor 103, circuit 200 does not require a diode network to be added electrically in series between the thyristor 103 and the ground 108. In the illustrated example, diode network 202 comprises a plurality of diodes consisting of a first set of two or more stacked diodes 402 electrically connected in parallel with a second set of two or more stacked diodes 404. The first and second sets of diodes 402 and 404 are arranged with opposing polarities such that the diode network 202 has a capacitance of 40 picofarads (pfd). Thus, the total tip-to-ground capacitance of the circuit 200 is (60×40)/(60+40), or 24 picofarads (pfd) and the total ring-to-ground capacitance of the circuit 200 is 25 picofarads (pfd). The overall off-state capacitance of the overvoltage protection circuit 200 is therefore (24×25)/(24+25), or 12.24 picofarads (pfd). Furthermore, the imbalance between the tip-to-ground capacitance and the ring-to-ground capacitance of the overvoltage protection circuit 200 is (25–24), or 1.0 picofarads (pfd). Thus, the addition of the single stacked diode network 202 reduces the overall off-state capacitance of the circuit 200 from 17.64 to 12.24 picofarads (pfd) and improves the imbalance between the tip-to-ground capacitance and the ring-to-ground capacitance of the circuit 200 from 35 to 1 picofarads (pfd) for high frequency transmissions.

It is understood that the present invention may take many forms and embodiments. Accordingly, several variations may be made in the foregoing without departing from the spirit or the scope of the invention. For example, any of the diode networks 300 400 or 500 depicted by FIGS. 3, 4, or 5 may be provided with one or more additional diode networks connected in parallel with the subject diode network. In another variation of the present invention, the order of the SSOVP 102 and the diode network 202 or the order of the SSOVP 103 and the diode network 203 may be reversed, such that the diode networks 202 and 203 (FIG. 2) are connected to the first and second electrical conductors 104 and 106, while the SSOVP 102 and the SSOVP 103 are connected to the common electrical ground 108. Alternatively, the order of the SSOVP 102 and diode network 202 may be reversed, while the order of the SSOVP 103 and diode network 203 remain as shown in FIG. 2.

Having thus described the present invention by reference to certain of its preferred embodiments, it is noted that the nembodiments disclosed are illustrative rather than limiting in nature, and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is intended that the appended claims be construed broadly and in a manner consistent with the scope of the invention.

That which is claimed is:

1. An overvoltage protection circuit comprising:
    a first overvoltage protection device and a first diode network electrically connected in series between a first electrical conductor and an electrical ground; and
    a second overvoltage protection device connected between a second electrical conductor and the electrical ground;
    wherein the first diode network comprises a first set of two or more stacked diodes electrically connected in parallel with a second set of two or more stacked diodes for carrying electrical currents between the first electrical conductor and the electrical ground, the first and second sets of stacked diodes arranged with opposing polarities so that the electrical currents flowing between the first electrical conductor and the electrical ground are bi-directional.

2. The overvoltage protection circuit of claim 1, wherein the first overvoltage protection device and the second overvoltage protection device each comprises an overvoltage protector having at least one element selected from the group consisting of a gas tube, an MOV, a TVS diode, and a TVS thyristor.

3. The overvoltage protection circuit of claim 1, wherein the first overvoltage protection device comprises a solid-state overvoltage protector (SSOVP) integrated with the first diode network onto a common semiconductor chip.

4. The overvoltage protection circuit of claim 1 further comprising a second diode network electrically connected in series between the second overvoltage protection device and the electrical ground.

5. The overvoltage protection circuit of claim 1, wherein the first electrical conductor is a telephone tip wire and the second electrical conductor is a telephone ring wire.

6. The overvoltage protection circuit of claim 1, wherein the first diode network comprises a plurality of diodes electrically connected in parallel and arranged with opposing polarities for carrying electrical currents between the first electrical conductor and the electrical ground.

7. An overvoltage protection circuit comprising:
    a first overvoltage protection device electrically connected in series with a diode network between a first electrical conductor and an electrical ground; and
    a second overvoltage protection device electrically connected between a second electrical conductor and the electrical ground;
    wherein the diode network comprises a first set of two or more diodes electrically connected in series and a second set of two or more diodes electrically connected in series, the first and second sets of two or more diodes being electrically connected in parallel and arranged with opposing polarities; and
    wherein the first and second sets of two or more diodes are interconnected by at least one shunt line between adjacent pairs of the first and second sets of two or more diodes.

8. A method for reducing off-state capacitance of an overvoltage protection circuit, comprising:
    electrically connecting a first overvoltage protection device to a first diode network in series between a first electrical conductor and an electrical ground; and
    electrically connecting a second overvoltage protection device between a second electrical conductor and the electrical ground;
    wherein the first diode network comprises a first set of two or more stacked diodes electrically connected in parallel with a second set of two or more stacked diodes for carrying electrical currents between the first electrical conductor and the electrical ground.

9. The method of claim 8, wherein the first overvoltage protection device and the second overvoltage protection device each comprises an overvoltage protector having at least one element selected from the group consisting of a gas tube, an MOV, a TVS diode, and a TVS thyristor.

10. The method of claim 8, wherein the first overvoltage protection device comprises a solid-state overvoltage protector (SSOVP) integrated with the first diode network onto a common semiconductor chip.

11. The method of claim 8, wherein the first electrical conductor is a telephone tip wire and the second electrical conductor is a telephone ring wire.

12. The method of claim 8, wherein the first diode network comprises a plurality of diodes electrically connected in parallel and arranged with opposing polarities for carrying electrical currents between the first electrical conductor and the electrical ground.

13. The method of claim 8, wherein the first diode network comprises two or more diodes electrically connected in parallel for carrying electrical currents between the first electrical conductor and the electrical ground in opposing polarities so that the electrical currents flowing between the first electrical conductor and the electrical ground are bi-directional.

14. A method for reducing off-state capacitance of an overvoltage protection circuit, comprising:
    electrically connecting a first overvoltage protection device in series with a diode network between a first electrical conductor and an electrical ground; and
    electrically connecting a second overvoltage protection device between a second electrical conductor and the electrical ground;
    wherein the diode network comprises a first set of two or more diodes electrically connected in series and a second set of two or more diodes electrically connected in series, the first and second sets of two or more diodes being electrically connected in parallel and arranged with opposing polarities; and
    wherein the first and second sets of two or more diodes are interconnected by at least one shunt line between adjacent pairs of the first and second sets of two or more diodes.

15. An overvoltage protection circuit comprising one or more circuit portions, each circuit portion comprising an overvoltage protection device and a diode network electrically connected in series between an electrical conductor and an electrical ground, wherein the diode network comprises a first set of stacked diodes electrically connected in parallel with a second set of stacked diodes for carrying electrical currents between the electrical conductor and the electrical ground, the first and second sets of stacked diodes arranged with opposing polarities so that the electrical currents flowing between the electrical conductor and the electrical ground are bi-directional.

* * * * *